UNITED STATES PATENT OFFICE.

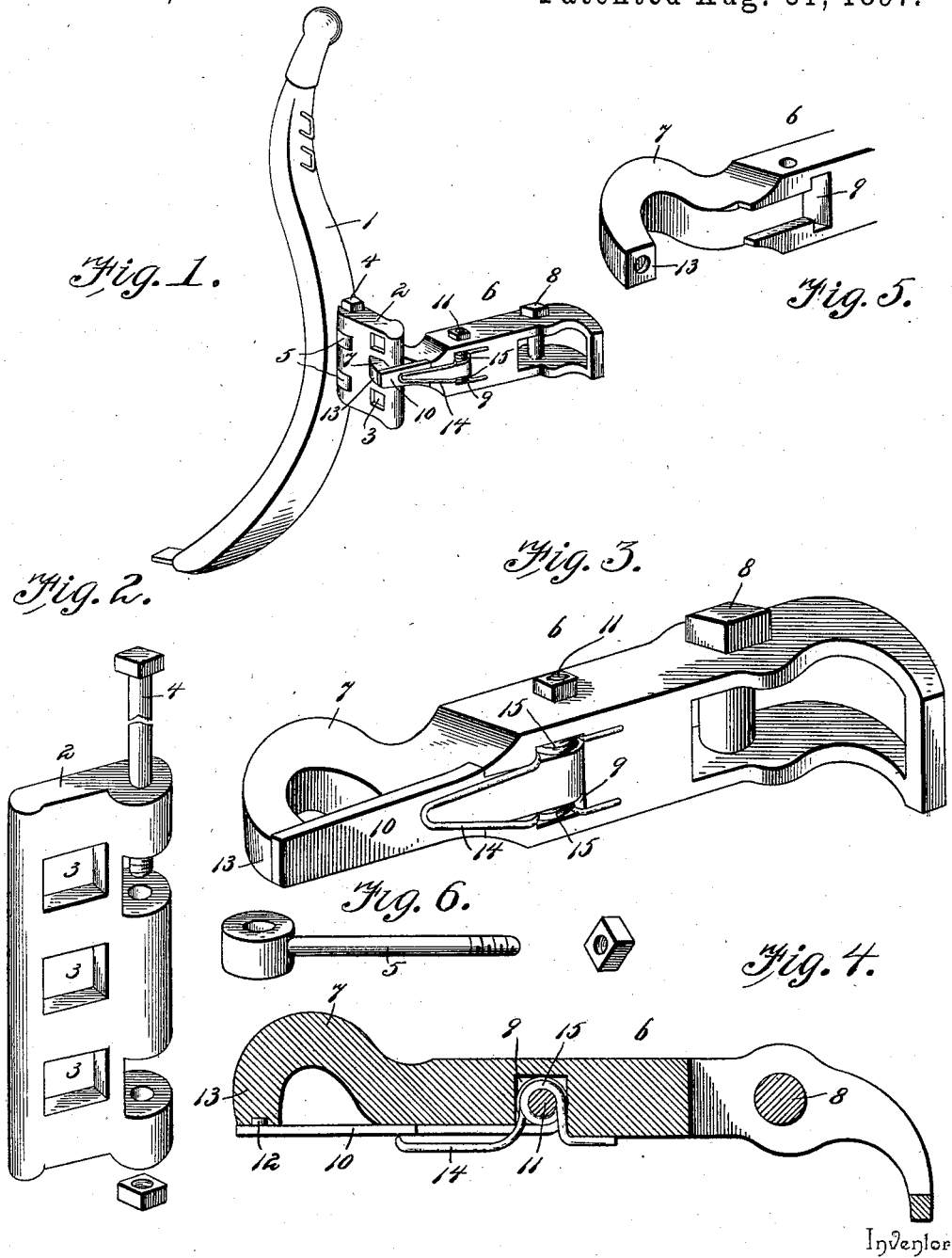

WILLIAM O. SCHELLHAMMER, OF CONWAY SPRINGS, KANSAS.

HAME-TUG.

SPECIFICATION forming part of Letters Patent No. 589,034, dated August 31, 1897.

Application filed February 15, 1897. Serial No. 623,548. (No model.)

*To all whom it may concern:*

Be it known that I, WILLIAM O. SCHELLHAMMER, a citizen of the United States, residing at Conway Springs, in the county of Sumner and State of Kansas, have invented a new and useful Hame-Tug, of which the following is a specification.

This invention relates to means for connecting traces with hames so as to admit of their raising and lowering according to the nature of the work and the height of the animal.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a perspective view of a hame, showing the application of the invention. Fig. 2 is a detail view in perspective of the plate which is pivotally connected with the hame and formed with a vertical series of openings for adjustable connection therewith of the trace or tug. Fig. 3 is a detail view of the hook to which the tug or trace is permanently attached and which is adjustably connected with the plate applied to the hame. Fig. 4 is a longitudinal section of the hook. Fig. 5 is a detail view of the front end portion of the hook. Fig. 6 is a detail view of an eyebolt for attaching the plate to a hame.

Corresponding and like parts are referred to in the following description and indicated in the several views of the drawings by the same reference-characters.

The hame 1 is of ordinary form and illustrates the application of the invention. The plate 2 is provided at one edge with a series of openings 3 and has pivotal connection at its opposite edge with the hame, and the pivotal edge is made rounding and is longitudinally bored to receive a pin or bolt 4, which passes through openings in the outer ends of eyebolts 5, employed for connecting the plate 2 with the hame 1.

The hook 6 is formed at one end with a loop 7 to receive the tug or trace, and a pin or bolt 8 passes through openings in the side members of the loop and is the means for connecting the tug or trace therewith. The opposite end of the hook is reduced and bent to form the hook proper, which is adapted to pass through any one of the openings 3 and provide for the raising and lowering of the tug or trace with reference to the hame.

A recess 9 is formed in a side of the body or plate comprising the hook and receives the butt-end of a latch 10, which is pivoted to the hook by means of a pin 11, the latter passing through the recess 9, an opening in the butt-end of the latch, and corresponding openings in the plate or body of the hook upon opposite sides of the recess. The latch 10 is seated in a depression formed in the same side of the hook with the recess 9, so as to come flush with the side of the hook, and extends across the throat or open end of the hook proper and is provided at its free end with a teat or projection 12 to enter an opening in the bill 13 of the hook proper, whereby the latch and hook are held in proper relation. The opposite sides of the latch are extended to overlap the end portions of the body of the hook bordering upon the depression, whereby a neat fit is secured.

A spring 14 is provided to hold the latch in positive engagement with the end of the bill 13, and this spring is formed of a single length of wire, which is doubled upon itself and has its side portions bent to provide coils 15 intermediate of the extremities of the spring, and these coils 15 come upon opposite sides of the butt-end of the latch and receive the pin 11, upon which the spring is mounted. The end portions of the spring engage, respectively, with the body of the hook and the latch, thereby attaining the desired end.

The attachment herein described is simple and effective for the purpose designed and admits of the trace or tug being raised or lowered to meet the nature and condition of the work to be performed, thereby applying the draft to the best possible advantage.

Having thus described the invention, what is claimed as new is—

1. In a hame attachment, the combination of a plate provided with a series of openings, a hook having a recess in a side, a latch seated in a depression in the same side of the hook with the recess and having its butt-end located in the said recess and pivotally connected with the hook, and a spring consisting of a wire doubled upon itself and having its side portions formed into coils intermediate of their ends and mounted upon the pin or bolt pivotally connecting the latch with the hook, and having its end portions engaging, respectively, with the hook and latch, substantially as set forth.

2. The herein-described hame attachment, comprising a plate having a series of openings along one edge, eyebolts pivotally connecting the plate at its opposite edge with a hame, a hook having a loop at one end and having a recess in a side, means for connecting a tug or trace with the loop of the hook, a latch seated in a depression in the same side of the hook with the recess and coming flush with the hook, means for pivotally connecting the latch with the hook, and a spring formed of a length of wire doubled upon itself and having its side members formed into coils intermediate of their ends and mounted upon the pin pivotally connecting the latch with the hook, substantially in the manner set forth for the purpose specified.

In testimony that I claim the foregoing as my own I have hereto affixed my signature in the presence of two witnesses.

WILLIAM O. SCHELLHAMMER.

Witnesses:
  THOS. BEAL,
  D. S. MILLER.